O. C. McCARTY.
Gate.
No. 215,530.
2 Sheets—Sheet 1.
Patented May 20, 1879.
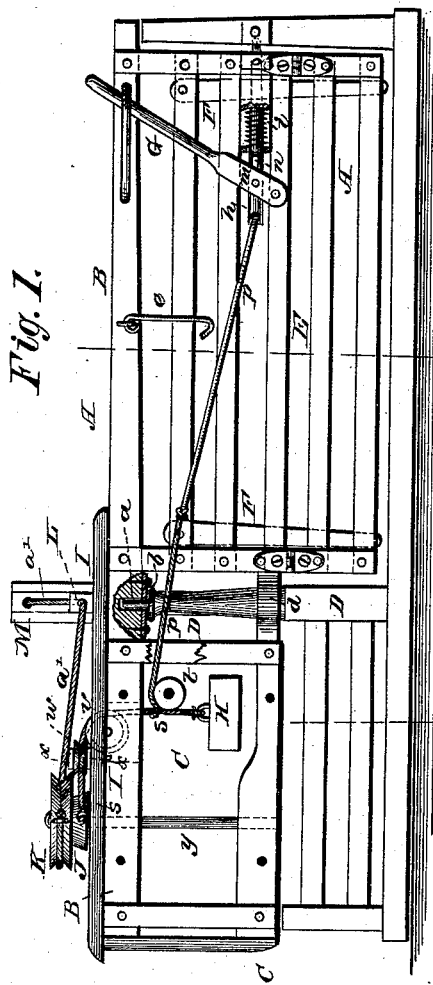
Fig. 1.
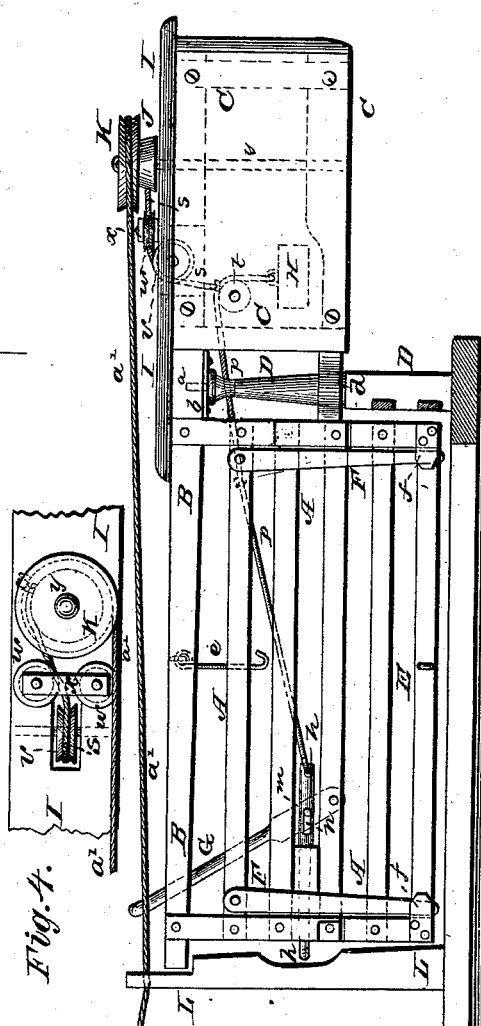
Fig. 2.
Fig. 4.
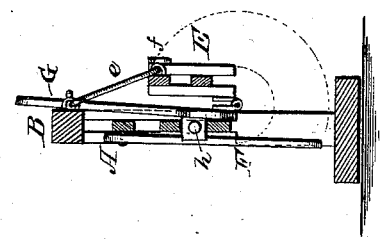
Fig. 3.
Witnesses:
P. C. Dieterich
Frank H. Duffy
Inventor
Oliver C. McCarty
Per C. H. Watson & Co. Attorneys.
N. PETERS, PHOTO-LITHOGRAPHER, WASHINGTON, D.C.

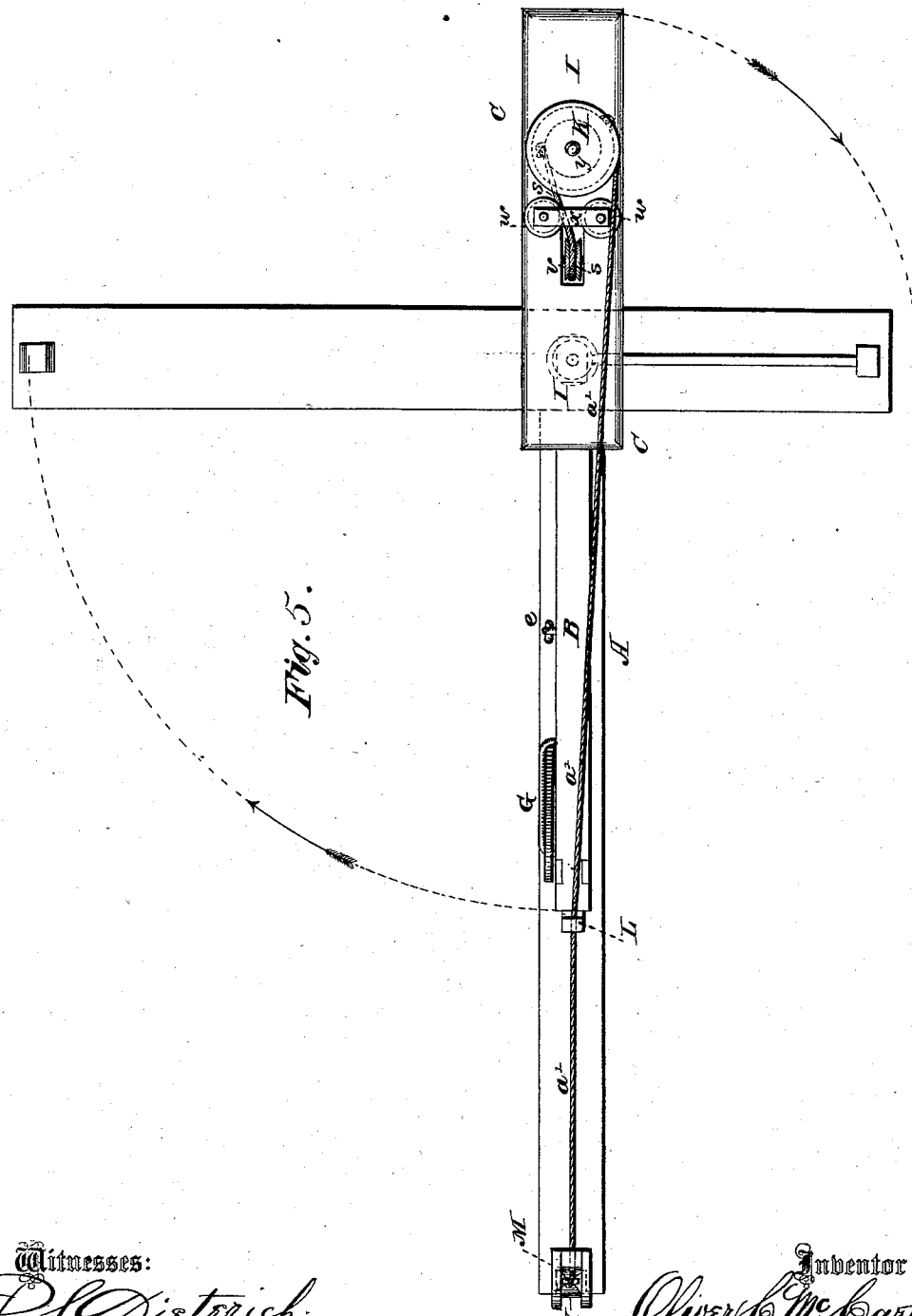

UNITED STATES PATENT OFFICE.

OLIVER C. McCARTY, OF POLK, OHIO.

IMPROVEMENT IN GATES.

Specification forming part of Letters Patent No. 215,530, dated May 20, 1879; application filed February 21, 1879.

*To all whom it may concern:*

Be it known that I, OLIVER C. MCCARTY, of Polk, in the county of Ashland and State of Ohio, have invented certain new and useful Improvements in Gates; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The nature of my invention consists in the construction and arrangement of a farm-gate, as will be hereinafter more fully set forth.

In the annexed drawings, which fully illustrate my invention, Figure 1 is a side elevation of my improved gate, showing the same closed. Fig. 2 is a view of the gate when open. Figs. 3 and 4 are detailed views of parts thereof. Fig. 5 is a plan view of the gate open.

A represents the gate proper, provided at the top with a bar or rail, B, which extends a suitable distance beyond the rear or inner end of the gate, and has a frame or box, C, suspended below its projecting end. Between the gate A and box C the bar or rail B is placed on top of a pin, $a$, projecting from the upper end of the fence-post D, said pin passing through a plate, $b$, attached to the lower side of the rail B, and then into said rail, as shown in Fig. 1, to form the pivot on which the gate swings. Suitable curved plates $d$ connect the box and gate on both sides of the post D to hold the gate in proper position.

The gate A is formed with its lower portion, E, made separate and hinged to the main body in such a manner that said lower part can be raised, as shown in Fig. 3, to allow small stock to pass through, while the body of the gate prevents large stock from going from one field to another. When the part E of the gate is raised it is held by a hook, $e$, and when let down it is held in place to form an integral part of the gate by means of a latch, F, at each end. This latch is pivoted at its upper end to the body of the gate, and its lower end swings into a catch, $f$, on the auxiliary gate E.

$h$ is the latch of the gate, pressed outward by means of a spiral spring, $i$, properly arranged for that purpose, and this latch is connected to a lever or handle, G, as shown in Figs. 1 and 2, said lever being pivoted at its lower end to the gate, and provided with a pin, $m$, passing through a slot, $n$, in the latch, so that the latch may be opened or withdrawn either by means of the lever, or it can work independently of said lever by means hereinafter described.

From the inner end of the latch $h$ a connection is made with a cord, $p$, which passes into the box C and over a pulley, $t$, within the same, and a weight, H, is attached to the end of said cord. Another cord, $s$, is attached to the inner end of the cord $p$, and passes up through the cap I of the box over a pulley, $v$, between horizontal pulleys $w$ $w$, and connects with a pulley, J, on a vertical shaft, $y$, passing through the box C, as shown. The two small pulleys $w$ $w$ are arranged between metal plates $x$ $x$, which form a passage for the cord $s$, and prevent said cord from slipping off. The pulley J is formed on or attached to the under side of a larger pulley, K, to which is attached a cord, $a'$, and this cord is passed through a post, L and M, and has a weight, N, attached to its end, the posts L and M being arranged on a line with the gate-post D at right angles to the line of the gate when closed.

The box C, with the weight H therein, balances the gate on the pivot $a$, so that it will turn freely. The gate is opened by taking hold of the lever G, withdrawing the latch $h$, and then turning the gate toward the post L. This causes the cord $a'$ to be wound on the pulley K and the cord $s$ on the pulley J. The gate will close automatically, by simply giving it a push, by the action of the weights H N and their cords on the pulleys.

The gate can also be opened by pulling on the cord $a'$, when the latch $h$ will first be withdrawn and the gate then turn away from the post L.

Having thus fully described my invention, what I claim as new, and desire to secure by Letters Patent is—

1. The swinging latches F and catches $f$, in combination with the gate A and auxiliary hinged gate E, substantially as and for the purposes herein set forth.

2. The combination of the gate A, spring-latch $h$, cords $p$ $s$, pulleys $t$, $v$, $w$, and J, and the weight H, said pulleys and weight being arranged in and on the balancing-box C of the gate, substantially as and for the purposes herein set forth.

3. The combination, with the cords $p$ $s$, latch $h$, weight H, and pulleys, as described, of the pulley K, cord $a'$, posts L M, and weight N, substantially as and for the purposes herein set forth.

In testimony that I claim the foregoing as my own I have hereto affixed my signature in presence of two witnesses.

OLIVER C. McCARTY.

Witnesses:
  JOHN C. JACOBY,
  JACOB FAST.